Figure 1:
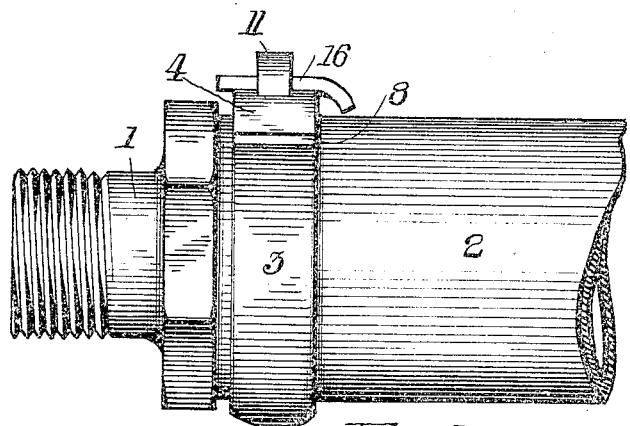

No. 792,376. PATENTED JUNE 13, 1905.
Y. YAMAMOTO.
CLAMP.
APPLICATION FILED DEC. 28, 1904.

Witnesses:
K. H. Butler
E. E. Potter

Inventor,
Yoshio Yamamoto,
By N. C. Evert & Co.
Attorneys.

No. 792,376.

Patented June 13, 1905.

UNITED STATES PATENT OFFICE.

YOSHIO YAMAMOTO, OF ALTOONA, PENNSYLVANIA.

CLAMP.

SPECIFICATION forming part of Letters Patent No. 792,376, dated June 13, 1905.

Application filed December 28, 1904. Serial No. 238,657.

*To all whom it may concern:*

Be it known that I, YOSHIO YAMAMOTO, a subject of the Emperor of Japan, residing at Altoona, in the county of Blair and State of Pennsylvania, have invented certain new and useful Improvements in Clamps, of which the following is a specification, reference being had therein to the accompanying drawings.

This invention relates to certain new and useful improvements in clamps, and more particularly to clamps which are adapted for use in connection with air-brake, steam-heat, water, or gas hose.

The object of this invention is to provide a novel form of clamp wherein the use of a nut and bolt are entirely dispensed with and a clamp provided that can be easily and quickly clamped upon a hose in such a manner that the entire inner surface of the clamp will bear against the hose and firmly hold the same in engagement with the ordinary type of nipple and coupling commonly employed in both ends of the hose.

Heretofore it has been common practice to employ a clamp wherein a bolt and nut are used for securing a clamp in position upon brake-hose. The operation of placing the clamp upon the hose has been most tedious, and the construction of the same has caused considerable inconvenience in securing the same upon a brake-hose. On account of the size of the bolt and nut which has heretofore been used it has required the use of a wrench to secure the nut upon the threads of the bolt, and it is necessary to change the grip four times for one turn of the nut upon the bolt. The construction of these clamps, which places the bolts in close proximity to the shoulder of the clamp, does not permit of a wrench being very conveniently placed upon a nut. Another disadvantage of the present form of clamp used is caused by the nuts not always fitting smoothly on the threads of the bolt or in some instances gearing in wrong threads, and in such small-sized nuts and bolts as are used in these types of clamps considerable trouble is experienced. To remove the old type of clamps from hose, it is the common practice to cut the bolt, because of the rust or injured threads making it impossible to remove the nut. A still further disadvantage resides in the present type of clamp owing to the fact that when the same is clamped the ends very often do not aline. This permits of one of the ends of the clamp engaging the hose more firmly than the other end, which causes a space to exist which will permit air leakage from the train-line in case of air-brake hose, and this feature alone causes considerable trouble in the running of a train. Also in common clamps there is always a tendency of the heads of the clamps to bend toward each other from the neck when they are pulled together too tight or when the internal pressure of the air in the hose expands the hose. This is a common cause of leakage or blowing off the nipples experienced in connection with high-pressure air-brakes, causing train parting and sometimes a wreck.

The clamp as constructed by me is adapted to overcome all the disadvantages and impractical features of clamps now used, and I have constructed my improved clamp whereby the cost of manufacture is reduced to a minimum and a strong and durable construction provided.

The invention finally resides in the novel construction, combination, and arrangement of parts, which will be hereinafter more fully described, and then specifically pointed out in the claims, and referring to the drawings accompanying this application like numerals of reference designate corresponding parts throughout the several views, in which—

Figure 2:
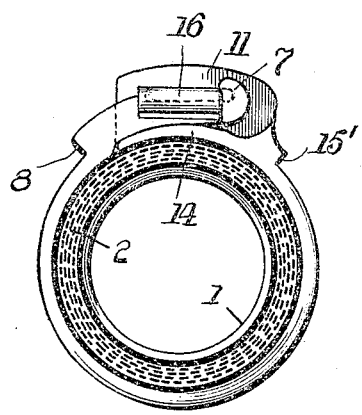
Figures 3, 4:
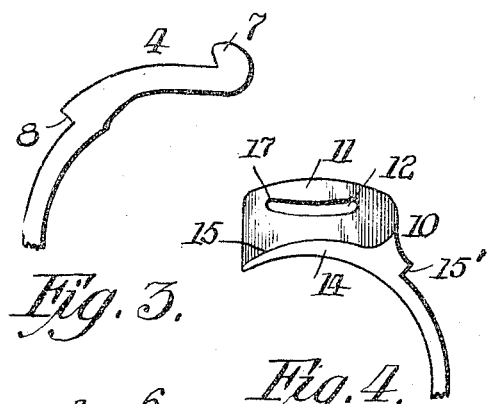
Figures 5, 6, 7, 8, 9:
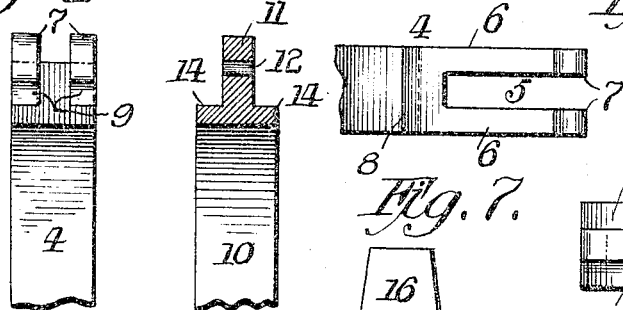

Figure 1 is a side elevation of the end of a brake-hose, illustrating the same connected to a nipple by my improved clamp. Fig. 2 is an end view of the same. Fig. 3 is a side elevation of one end of the clamp. Fig. 4 is a side elevation of the opposite end. Fig. 5 is an end view of the end of the clamp illustrated in Fig. 3. Fig. 6 is a vertical sectional view of the end of the clamp illustrated in Fig. 4. Fig. 7 is a top plan view of the end of the clamp illustrated in Fig. 3. Fig. 8 is a similar view of the end of the clamp illustrated in Fig. 4, and Fig. 9 is a detail view of a wedge which I employ in connection with my improved clamp.

To clearly illustrate my invention, I have illustrated the clamp as being used in connection with a nipple 1 and a section of brake-hose 2. The nipple is threaded at its one end to screw into an angle-cock, and the other end is forced into the hose and then held in position by my improved clamp 3. The brake-hose 2 is of a conventional form generally used in connection with the air-brake service of a train and is preferably made of layers of strong duck and rubber. The opposite end of the hose is adapted to carry a coupler, which is also to be fitted with my clamp.

My improved clamp is preferably constructed of a band of metal, which is adapted to surround the end of the brake-hose 2 adjacent to the nipple 1, and the ends of my improved clamp are illustrated in Figs. 3 to 8, inclusive. The one end of the clamp, as designated by the reference-numeral 4, is bifurcated, as indicated at 5, forming side arms 6 6. The ends of these side arms are upset, forming hook-shaped ends 7 7. In forming the end 4 of the clamp I provide a shoulder 8, the object of which will be hereinafter more fully described. The other end of the clamp, as designated by the reference-numeral 10 and illustrated in Fig. 4 of the drawings, is provided with a central vertical web portion 11, which is provided with a slot 12. The end 10 of the clamp forms flanges 14 upon each side of the web portion 11 and the top surface of these flanges taper, as indicated at 15, whereby when the ends are clamped together the flanges 14 may engage under the end 4 of the clamp. In forming the end 10 of the clamp I provide a shoulder 15', the object of which will be presently described.

The reference-numeral 16 designates a wedge-shaped key which is employed for locking the ends of the clamp together.

The manner of securing my improved clamp upon a brake-hose is as follows: To force the ends 4 and 10 of the clamp in engagement with one another, I employ a vise, the jaws of said vise being adapted to engage the shoulders 8 and 15' of the ends 4 and 10, respectively, of the clamp. When the end 4 of the clamp is forced into engagement with the end 10 by the vise, the arms 6, formed by the bifurcation of the end 4 of the clamp, ride upon the flanges 14 14 of the clamp end 10, and as soon as the hook-shaped end 7 of the clamp end 4 has traveled some distance, moving hose against nipple until it is tightened properly, the wedge-shaped key 16 is inserted in the slot 12 and driven in. It engages the hook-shaped end 7 and against outside end 17 of the slot 12 of the clamp end 10. Then by a couple of blows from a light hammer the wedge-shaped key 16 can be moved inwardly, giving further tightness and locking the ends 4 and 10 of the clamp together. The end of the key can then be bent downwardly, whereby it is prevented from becoming disengaged from the ends of the clamp, and thereby permitting the same to release the hose from the nipple.

It will be observed from the accompanying drawings and by reference to Fig. 2 of the drawings that the interior surface of the clamp firmly engages at all points the surface of the brake-hose and that the ends of the clamp are firmly locked in engagement with one another, not allowing any tendency to swell out caused by the bending of the neck of the common clamp. The construction of the nipples provides sufficient room for the use of a hammer in securing the wedge-shaped keys within the ends of the clamps, and should it be desired to remove the clamp at any time an instrument may be inserted under the bent-down end of the key to pry the same upwardly, when by a blow from a light hammer the wedge can be disengaged from the ends of the clamp. On account of the ends of the clamp firmly engaging the brake-hose an air-tight joint is formed between the brake-hose and the end of a nipple and the leakage of air prevented.

While I have herein shown the preferred manner of constructing my improved clamp, it is obvious that the position and formation of the shoulders 8 and 15' and the form of key can be changed or either malleable iron or sheet-steel pressed to the shape may be adopted, and I do not care to confine myself to the specific shape of the ends of the clamp as illustrated, but may vary the same without departing from the general spirit and scope of the invention.

What I claim, and desire to secure by Letters Patent, is—

1. A clamp comprising a band, having ends adapted to mesh with one another, one of said ends being bifurcated and hook-shaped, a slotted web portion carried by the other end and adapted to engage in said bifurcated end, and means passing through said slot to detachably lock said ends together, substantially as described.

2. A clamp of the type described comprising a band having one end bifurcated and upturned at its extremities, the other end being formed with a slotted vertical web portion and each end being formed with a shoulder, and a wedge passing through the slot in said web portion and abutting the said upturned extremities of said bifurcated end.

In testimony whereof I affix my signature in the presence of two witnesses.

YOSHIO YAMAMOTO.

Witnesses:
A. B. CROMER,
H. E. RESSLER.